US008201184B2

United States Patent
Thies et al.

(10) Patent No.: US 8,201,184 B2
(45) Date of Patent: Jun. 12, 2012

(54) SYSTEMS AND METHODS FOR PARALLELIZING GRID COMPUTER ENVIRONMENT TASKS

(75) Inventors: Eric Steven Thies, Harrisonburg, VA (US); Cheryl Gehring Doninger, Cary, NC (US); Richard Dean Langston, Cary, NC (US)

(73) Assignee: SAS Institute Inc., Cary, NC (US)

( * ) Notice: Subject to any disclaimer, the term of this patent is extended or adjusted under 35 U.S.C. 154(b) by 1001 days.

(21) Appl. No.: 12/104,695

(22) Filed: Apr. 17, 2008

(65) Prior Publication Data
US 2009/0077563 A1 Mar. 19, 2009

Related U.S. Application Data

(60) Provisional application No. 60/971,988, filed on Sep. 13, 2007.

(51) Int. Cl.
*G06F 9/46* (2006.01)
(52) U.S. Cl. ........................................................ 718/106
(58) Field of Classification Search .................. None
See application file for complete search history.

(56) References Cited

U.S. PATENT DOCUMENTS

| | | | |
|---|---|---|---|
| 6,253,371 B1 * | 6/2001 | Iwasawa et al. | 717/150 |
| 6,944,754 B2 * | 9/2005 | Zilles et al. | 712/233 |
| 2004/0078780 A1 * | 4/2004 | Dutt et al. | 717/106 |
| 2004/0194074 A1 * | 9/2004 | Shibayama et al. | 717/151 |
| 2006/0136881 A1 * | 6/2006 | Nesbitt et al. | 717/140 |
| 2007/0162914 A1 * | 7/2007 | Deen et al. | 719/330 |
| 2007/0250365 A1 * | 10/2007 | Chakrabarti et al. | 705/8 |
| 2008/0225950 A1 * | 9/2008 | Zhu | 375/240.14 |
| 2008/0301642 A1 * | 12/2008 | Alimi et al. | 717/121 |

* cited by examiner

*Primary Examiner* — Jacob A Petranek
(74) *Attorney, Agent, or Firm* — Jones Day

(57) ABSTRACT

Systems and methods for executing a computer program within a multiple processor grid computing environment. Execution behavior of the computer program is captured while the computer program is sequentially executing. The captured execution behavior is linked with steps contained in the source code version of the computer program. The captured execution behavior that is linked with the supplemented source code version is analyzed in order to determine dependencies between a step of the computer program and one or more other steps of the computer program. A determination is made of which task or tasks within the computer program can be processed through the grid computing environment based upon the determined dependencies.

27 Claims, 10 Drawing Sheets

400

SAS.TXT data a; x=1; run;

data b; x=1; run;

data c; set a b; run;

GRID.TXT - PAGE 1

```
/*------------------------------------------------------*/
/* There are 3 tasks in this job.                       */
/* 3 of these tasks can be RSUBMITed.                   */
/* These 3 tasks used 341 units of time.                */
/* The longest task took 171 units of time, 50.1% of total time. */
/*------------------------------------------------------*/
/*------------------------------------------------------*/
/* This is the user-modifiable number of connect sessions */
/* Numbers of sessions should be between 1 and 20 inclusive. */
/*------------------------------------------------------*/
%let SCAGRID_SESSIONS=3;

/*------------------------------------------------------*/
/* *** Please don't edit anything below this line.      */
/* *** Regenerate the file if you need to make changes. */
/*------------------------------------------------------*/
/*------------------------------------------------------*/
/* This is the USER option from the original run of the job. */
/*------------------------------------------------------*/
libname USER ".";

/*------------------------------------------------------*/
/* This macro starts up the connect sessions            */
/*------------------------------------------------------*/
%macro scagrid_sessions(count);
   %do i = 1 %to &count;
      signon sess&i sascmd="!sascmd" connectwait=no inheritlib=(user) ;
   %end;
%mend scagrid_sessions;

/*------------------------------------------------------*/
/* Start up our connect sessions.                       */
/*------------------------------------------------------*/
%let rc=%sysfunc(grdsvc_enable(_all_, resource=SASMain));
%scagrid_sessions(&SCAGRID_SESSIONS);

/*------------------------------------------------------*/
/* This function call initializes data structures for our SCAGRID functions. */
/* We pass in the number of sessions and the number tasks in this job. */
/*------------------------------------------------------*/
proc scaproc; startup 3 &SCAGRID_SESSIONS; run;

/*------------------------------------------------------*/
/* TASK 1 run in rsubmit                                */
/*------------------------------------------------------*/
/* I/O Activity                                         */
/*------------------------------------------------------*/
/* FILE    INPUT    created in task 0 \\sanyo\U52\thies\work\patent\sas.txt */
/* DATASET OUTPUT SEQ created in task 1 USER.A.DATA     */
/*------------------------------------------------------*/
/* Symbol activity                                      */
/*------------------------------------------------------*/
/*------------------------------------------------------*/
/* ELAPSED 171                                          */
/*------------------------------------------------------*/
/*------------------------------------------------------*/
/* Get an available session with the scagrid_gs function */
/*------------------------------------------------------*/
proc scaproc; getsession 1 "sess"; run;
%put sess=&sess;
/*------------------------------------------------------*/
/* rsubmit for task 1                                   */
/*------------------------------------------------------*/
rsubmit &sess sysrputsync=yes cmacvar=scagrid_task_1;
/*------------------------------------------------------*/
/* data a - creates dataset a - no dependancies         */
/* data b - creates dataset b - no dependancies         */
/* data c - creates dataset c from a and b and so depends on step 1 and 2 */
/*------------------------------------------------------*/ data a; x=1; run;

endrsubmit;
```

602

604 (Creation of 3 remote sessions.)

606

608 (Run the First task)

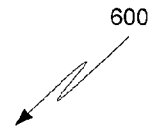

FIG. 8

GRID.TXT - PAGE 2

```
/*-----------------------------------------------------------*/
/* TASK 2 run in rsubmit                                    */
/*-----------------------------------------------------------*/
/* I/O Activity                                             */
/*-----------------------------------------------------------*/
/* DATASET   OUTPUT SEQ  created in task 2 USER.B.DATA      */
/*-----------------------------------------------------------*/
/* Symbol activity                                          */
/*-----------------------------------------------------------*/
/*-----------------------------------------------------------*/
/* ELAPSED 78                                               */
/*-----------------------------------------------------------*/
/*-----------------------------------------------------------*/
/* Dependancies                                             */
/* Highest task depended on: 0                              */
/*-----------------------------------------------------------*/
/*-----------------------------------------------------------*/
/* Get an available session with the scagrid_gs function    */
/*-----------------------------------------------------------*/
proc scaproc; getsession 2 "sess"; run;
%put sess=&sess;
/*-----------------------------------------------------------*/
/* rsubmit for task 2                                       */
/*-----------------------------------------------------------*/
rsubmit &sess sysrputsync=yes cmacvar=scagrid_task_2;
data b; x=1; run;

endrsubmit;
```

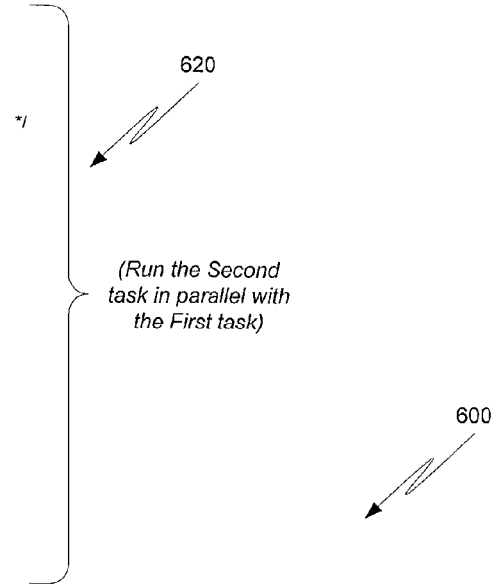

(Run the Second task in parallel with the First task)

600

```
/*-----------------------------------------------------------*/
/* TASK 3 run in rsubmit                                    */
/*-----------------------------------------------------------*/
/* I/O Activity                                             */
/*-----------------------------------------------------------*/
/* DATASET   INPUT  SEQ  created in task 1 USER.A.DATA      */
/* DATASET   INPUT  SEQ  created in task 2 USER.B.DATA      */
/* DATASET   OUTPUT SEQ  created in task 3 USER.C.DATA      */
/* FILE      OUTPUT      created in task 3 \\sanyo\U52\thies\work\patent\pass1.txt */
/*-----------------------------------------------------------*/
/* Symbol activity                                          */
/*-----------------------------------------------------------*/
/*-----------------------------------------------------------*/
/* ELAPSED 92                                               */
/*-----------------------------------------------------------*/
/*-----------------------------------------------------------*/
/* Dependancies                                             */
/* Depends on task 1 DATASET USER.A.DATA                    */
/* Depends on task 2 DATASET USER.B.DATA                    */
/* Highest task depended on: 2                              */
/*-----------------------------------------------------------*/
/*-----------------------------------------------------------*/
/* Sync with task 1 (USER.A.DATA)                           */
/*-----------------------------------------------------------*/
proc scaproc; taskwait 1; run;
/*-----------------------------------------------------------*/
/*-----------------------------------------------------------*/
/* Sync with task 2 (USER.B.DATA)                           */
/*-----------------------------------------------------------*/
proc scaproc; taskwait 2; run;
/*-----------------------------------------------------------*/
/*-----------------------------------------------------------*/
/* Get an available session with the scagrid_gs function    */
/*-----------------------------------------------------------*/
proc scaproc; getsession 3 "sess"; run;
%put sess=&sess;
/*-----------------------------------------------------------*/
/* rsubmit for task 3                                       */
/*-----------------------------------------------------------*/
rsubmit &sess sysrputsync=yes cmacvar=scagrid_task_3;
data c; set a b; run;

endrsubmit;
```

622

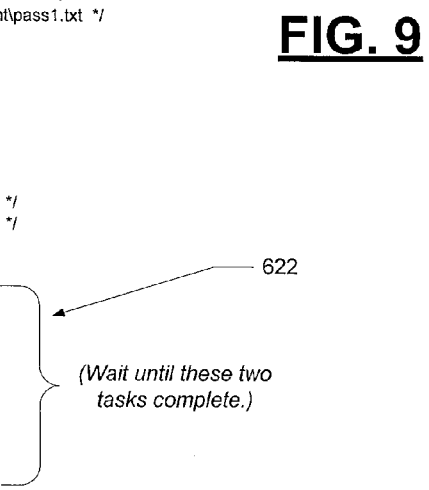

(Wait until these two tasks complete.)

GRID.TXT - PAGE 3

```
/*------------------------------------------------------------*/
/* This macro issues waitfors and signoffs for our sessions.  */
/*------------------------------------------------------------*/
%macro scagrid_waitfors(count);
   %do i = 1 %to &count;
      waitfor sess&i;
      signoff sess&i;
   %end;
%mend scagrid_waitfors;

/*------------------------------------------------------------*/
/* Wait for and sign off all sessions.                        */
/*------------------------------------------------------------*/
%scagrid_waitfors(&SCAGRID_SESSIONS);     ◄────── 630

/*------------------------------------------------------------*/
/* Termination for our SCAGRID functions.                     */
/*------------------------------------------------------------*/
proc scaproc; shutdown; run;     ◄────── 632

/*------------------------------------------------------------*/
/* All done.                                                  */
/*------------------------------------------------------------*/
```

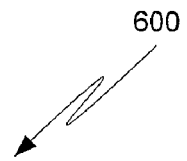

FIG. 10

SYSTEMS AND METHODS FOR PARALLELIZING GRID COMPUTER ENVIRONMENT TASKS

CROSS-REFERENCE TO RELATED APPLICATION

This application claims priority to and the benefit of U.S. Application Ser. No. 60/971,988, (entitled "Systems and Methods for Grid Enabling Computer Jobs" and filed on Sep. 13, 2007), of which the entire disclosure (including any and all figures) is incorporated herein by reference.

TECHNICAL FIELD

This document relates generally to computer-implemented systems for computer program execution and more particularly to grid-enabled computer jobs.

BACKGROUND AND SUMMARY

Grid computing provides unique processing advantages by distributing processing across a parallel infrastructure. This is typically advantageous in handling a large-scale computationally intensive problem (e.g., a distributed application computing problem). However, certain computer programs do not adapt well to a grid-type computing environment because they are written in a sequential language (e.g., each step is executed fully before the next step begins).

In accordance with the teachings provided herein, systems and methods for operation upon data processing devices are provided for executing a sequentially operating computer program within a multiple processor grid computing environment. Execution behavior of the computer program is captured while the computer program is sequentially executing. The captured execution behavior is linked with steps contained in the source code version of the computer program. The captured execution behavior that is linked with the supplemented source code version is analyzed in order to determine dependencies between a step of the computer program and one or more other steps of the computer program. A determination is made of which task within the computer program can be processed through the grid computing environment based upon the determined dependencies.

As another example, a system and method can be configured for executing a computer program within a multiple processor grid computing environment, wherein the computer program is written in a sequential language such that each step of the computer program completes its execution before a next step of the computer program begins. Execution behavior of the computer program is captured while the computer program is sequentially executing. The captured execution behavior is linked with steps contained in the source code version of the computer program. The captured execution behavior that is linked with the supplemented source code version is analyzed in order to determine dependencies between a first step of the computer program and other steps of the computer program. A determination is made of which task or tasks within the computer program can be processed through the grid computing environment based upon the determined dependencies.

BRIEF DESCRIPTION OF THE DRAWINGS

FIGS. 6-10 depict an example of various programs that can be generated during the transformation of a program into a grid-enabled computer program.

DETAILED DESCRIPTION

Figure 1:
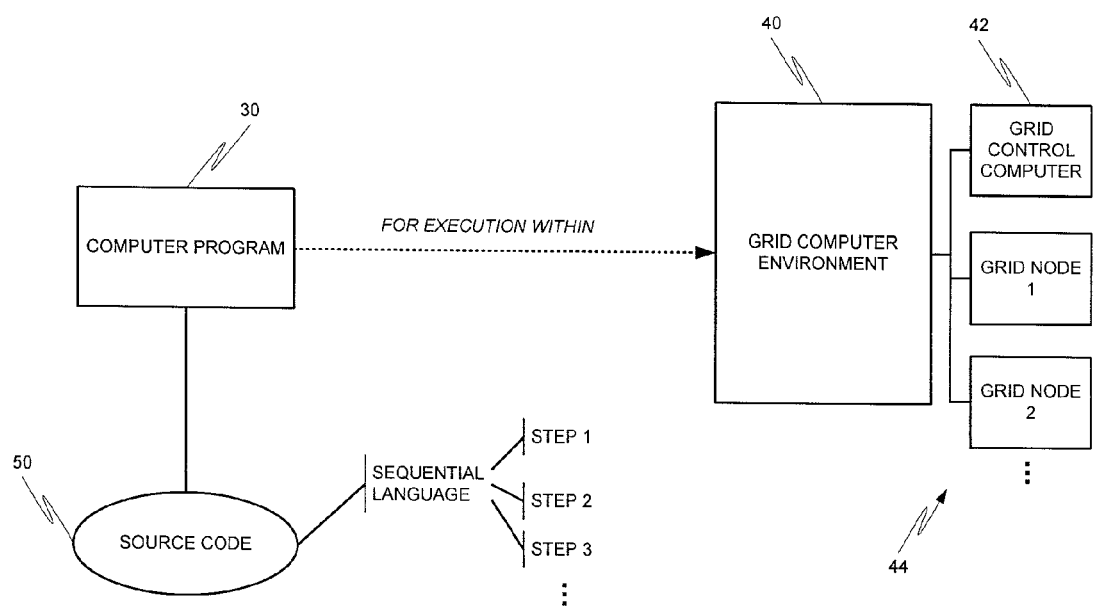
FIG. 1 is a block diagram depicting a grid computer environment.

FIG. 1 depicts handling a computer program 30 for execution within a grid computer environment 40. A grid computer environment 40 typically applies the resources of many computers or servers in a network to a single problem at about the same time. The problem can involve complex data analysis operations and/or processing large data sets which require a great number of computer processing cycles. Grid computing uses a grid control computer 42 to divide and farm out pieces of a program 50 to the many grid nodes 44 (e.g., computers, servers, etc.).

As shown in FIG. 1, the computer program 50 has been written in a sequential language, which typically results in each step of the computer program 50 completing its execution before a subsequent step (e.g., a next step) of the computer program 50 begins. Computer programs written in a sequential type language have proven difficult to implement within a grid computer environment 40 such that the parallel processing capabilities of the grid computer environment 40 can be realized. The systems and methods described herein allow a computer program 50 that is essentially sequential in execution to be configured so as to realize at least in part the parallel processing advantages that a grid computer environment 40 provides.

Figure 2:
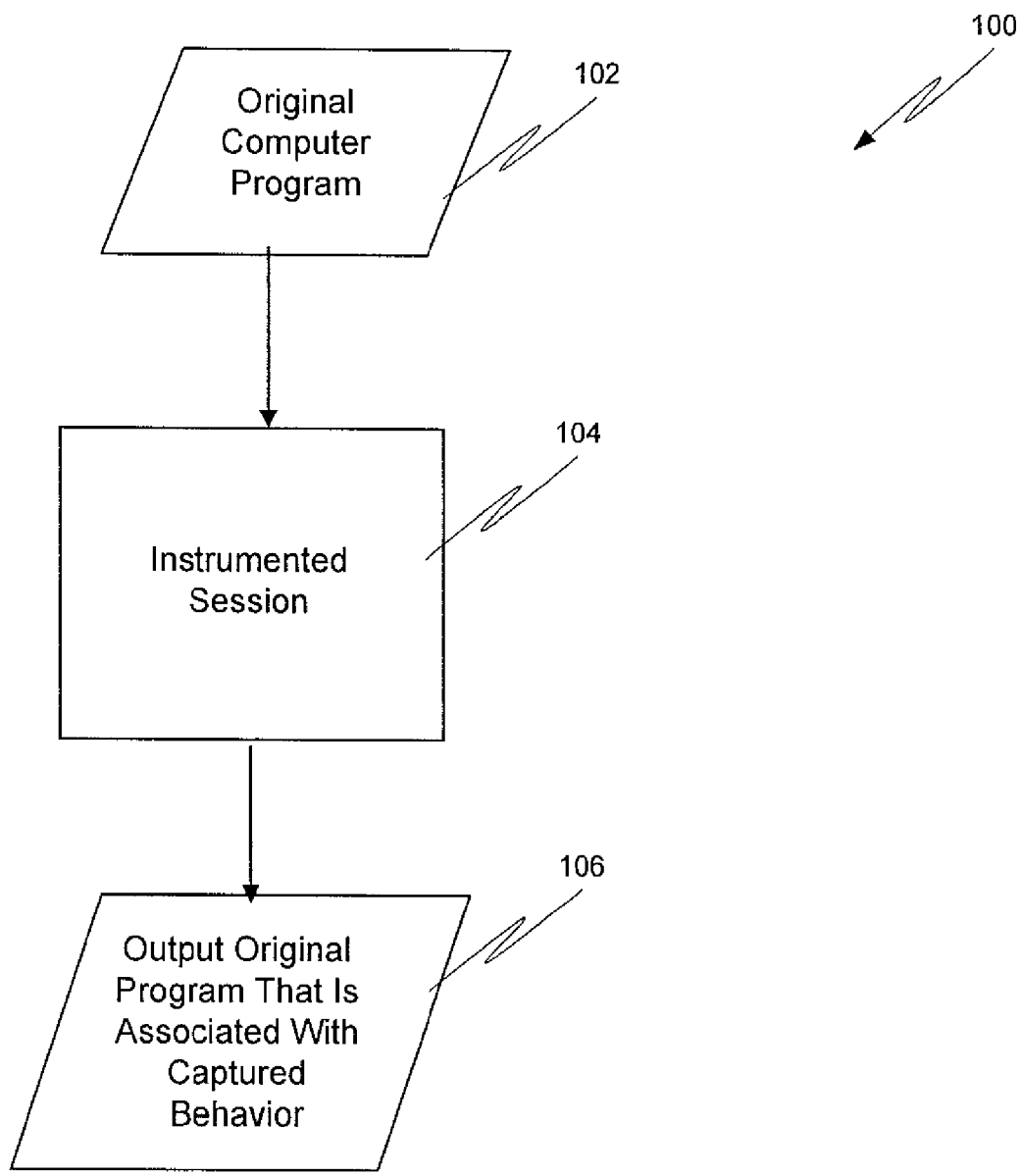
FIGS. 2 and 3 are flowcharts depicting processing flows to transform a computer program into a grid-enabled version.

FIG. 2 illustrates at 100 a processing flow that transforms a computer program that has been written in a sequential language into a grid-enabled version that takes advantage of the grid computer environment. In FIG. 2, the processing flow begins with the original program (e.g., a statistical analysis software program, etc.), and an instrumented session is performed at 104 that captures the execution behavior of the computer program while the computer program is sequentially executing (e.g., on a computer or server). The processing flow then provides at 106 a link between the original program and the captured execution behavior information, such as in the form of embedding the original program with comments about the execution behavior of one or more of the steps within the computer program.

Figure 3:
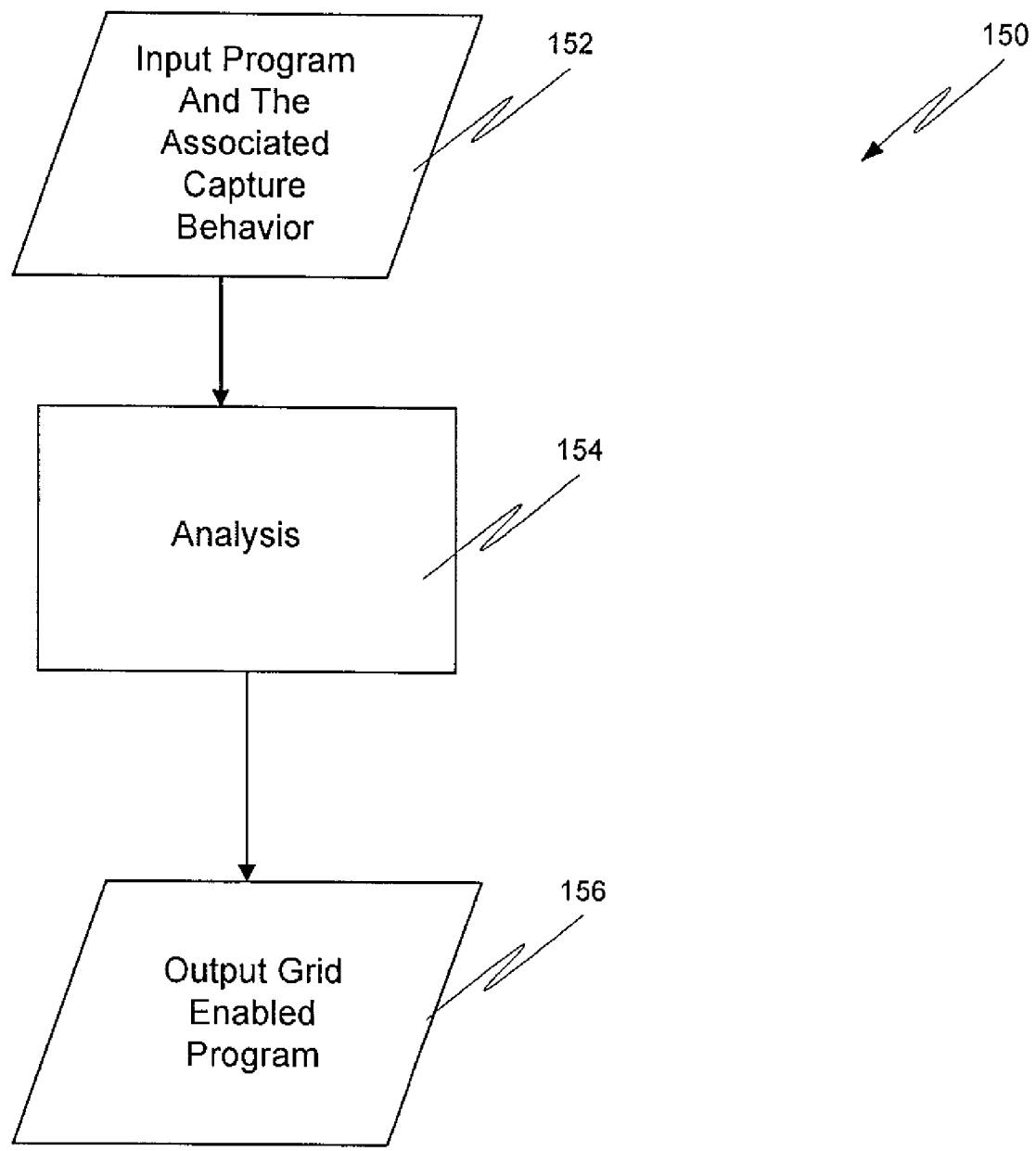

With reference to FIG. 3, processing flow 150 receives as input the program and the associated captured behavior at 152 and performs at 154 analysis of the captured execution behavior that is linked with the source code version of the program. The analysis includes a determination of the dependencies among the steps of the computer program. Based upon the determined step dependencies, the processing flow 150 determines at 156 which task or tasks within a computer program can be processed in parallel through the grid computing environment.

Figure 4:
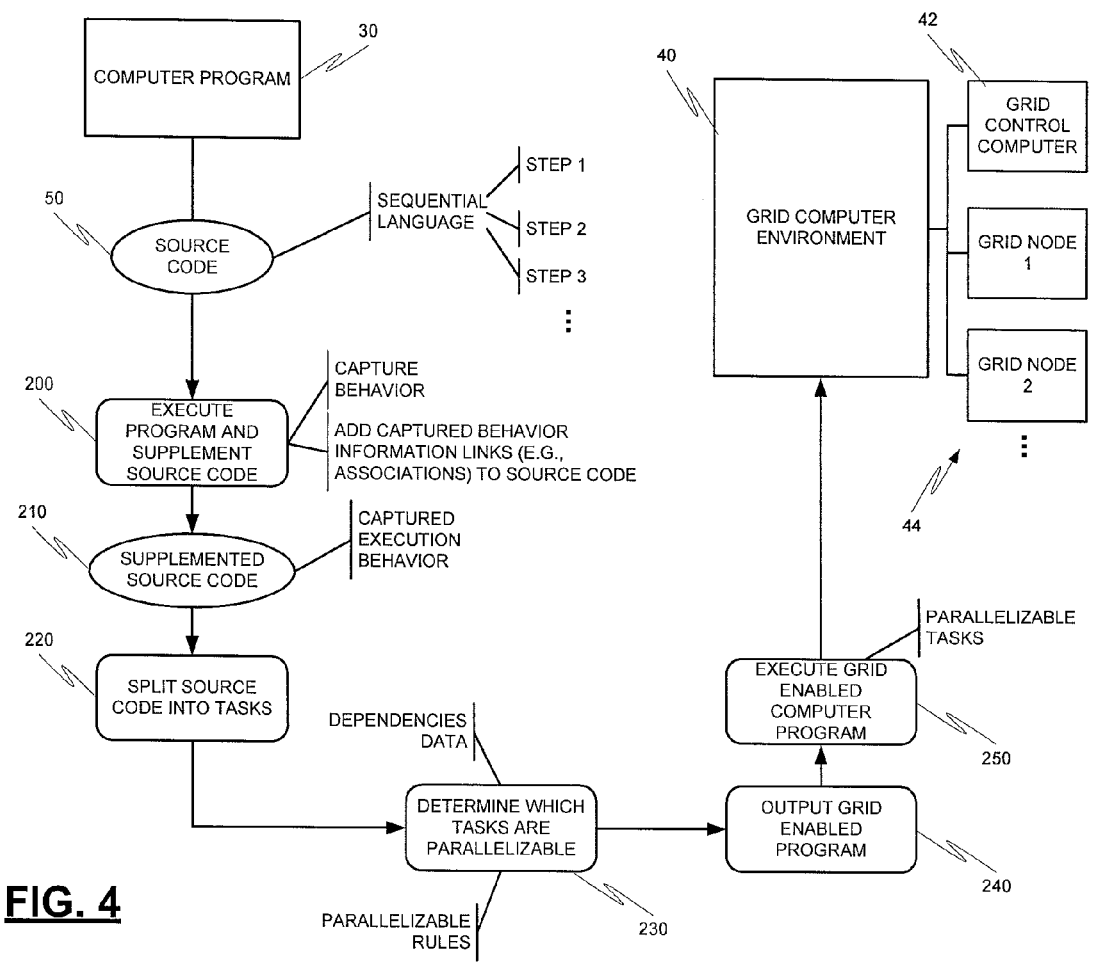
FIGS. 4 and 5 are block diagrams depicting operational scenarios for transforming a computer program into a grid-enabled program.

FIG. 4 depicts another operational scenario for transforming a computer program 30 into a grid-enabled program 240. In this operational scenario, a computer program 30 is executed at 200 so that its execution behavior can be captured. The captured behavior is linked with the source code 50 of the computer program 30 in order to provide an association between the steps or tasks (within the program 30) with their corresponding execution behavior. The links can be done in many different ways, such as embedding within the source code 50 of the computer program 30 itself comments about the captured behavior. As an illustration of another way, one or more data tables can contain the captured behavior, the lines of code, and the interrelationships that depict which lines of code are associated with what captured behavior.

The supplemented source code 210 (i.e., the source code version that contains the captured execution behavior) is used to split the source code into tasks at 220. The processing flow then determines at 230 which tasks are capable of operating in parallel with respect to each other (e.g., determining which tasks are parallelizable) and which tasks are dependent upon other tasks.

Rules can assist in the dependency determination. As an example, the rules can include determining dependencies between a first step and the other steps based upon files that are created with respect to the first step and other steps, based upon inputs and outputs associated with the first step and the other steps, based upon which macro symbols the first step and the other steps read and set, etc. It is noted that the term "first step" merely indicates any particular step within a program and is not limited to meaning the very first step that is executed in a program.

After the task dependency analysis has completed at 230, a grid-enabled program is generated at 240 that contains the tasks of the original computer program 30 that are now configured to operate within the grid computer environment 40 based upon the determined task dependencies. For example, the grid-enabled computer program version can specify that two tasks can execute in parallel. The grid-enabled computer program is then able to be executed at 250 within the grid computer environment 40.

Figure 5:
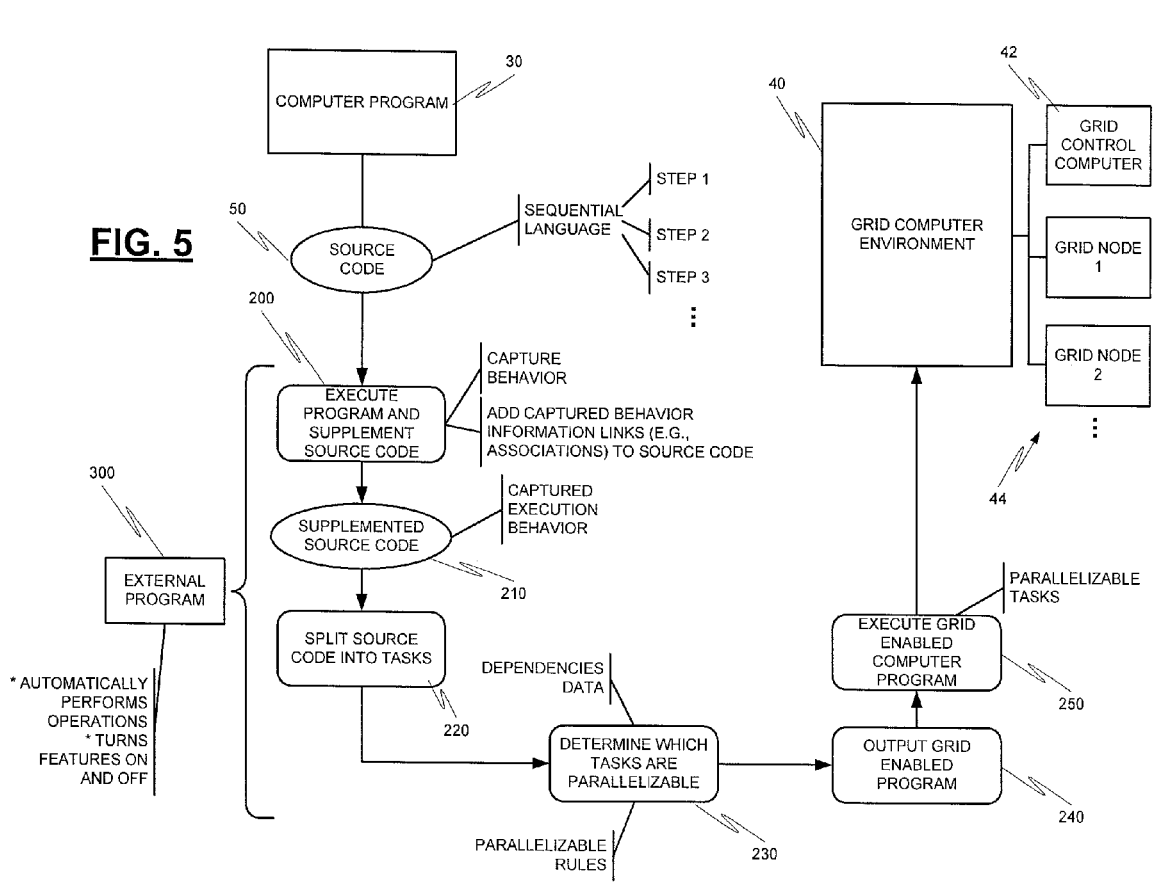

FIG. 5 illustrates that an external program 300 can be used to automatically perform the operations which generate a grid-enabled computer program. The external program 300 can also turn the grid enabling features on and off based upon the situation at hand. The external program 300 can also create internal hooks in a supervisor program to monitor the executing computer program and capture the execution behavior.

While the computer program is executing, the created internal hooks are used to determine dependencies between a first step and the other steps based upon one or more aspects, such as files that are created with respect to a first step and other steps, based upon inputs and outputs associated with the first step and the other steps, based upon which macro symbols the first step and the other steps read and set, etc.

It should be understood that similar to the other processing flows described herein, the steps and the order of the steps in FIGS. 4 and 5 may be altered, modified, removed and/or augmented and still achieve the desired outcome. For example, processing can be done in two phases, wherein the steps of the first phase can include:
 1. Run the original job with a code analyzer hooks turned on.
 2. Gather information from hooks as the job runs.
 3. When the job completes, output a copy of the original job into a new file interspersed with comments containing the information we collected from the callbacks.

The steps of the second process can generate a grid-enabled job from the commented source as follows:
 1. Read the file, split into tasks with SAS source information, I/O and Macro usage.
 2. Any task which reads or writes files in the WORK directory is marked as not parallelizable.
 3. Generating output, we start by initializing the remote Connect sessions.
 4. With each task:
   a. Does this task depend on files generated by previous steps? If so, generate a statement which will wait for each previous task to complete before this task can run.
   b. Does this task depend on Macro symbols set by previous steps? If so, generate a statement which will wait for each previous task to complete before this task can run.
   c. If this task is parallelizable, generate code to get an available Connect session to run the task. If we have not generated any code above to wait for a previous task, this Connect session may run in parallel with other currently running Connect sessions.
   d. If this task is parallelizable, for any macro symbols needed by this task, generate % syslput statements to transfer the symbol to the chosen remote session.
   e. If this task is parallelizable, generate a job submit statement for this session.
   f. Output the task source statements.
   g. It this task is parallelizable, for any symbols needed by future tasks which were set by this task, generate % sysrput statements to transfer the symbol values back to the client session.
   h. If this task is parallelizable, Generate ENDRSUBMIT statement.
 5. Wait for all remote sessions to finish.

Figure 6:
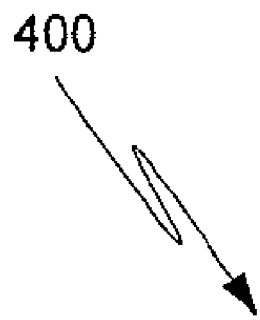

FIGS. 6-10 depict an example of various programs that can be generated during the transformation of a program into a grid-enabled computer program. FIG. 6 depicts at 400 a computer program (whose source code is stored in the file "SAS.TXT") containing three steps that create different sets of data. Data step "a" creates data set "a." Data step "b" creates data set "b." Data step "c" creates data set "c" based upon the data sets "a" and "b."

Figure 7:
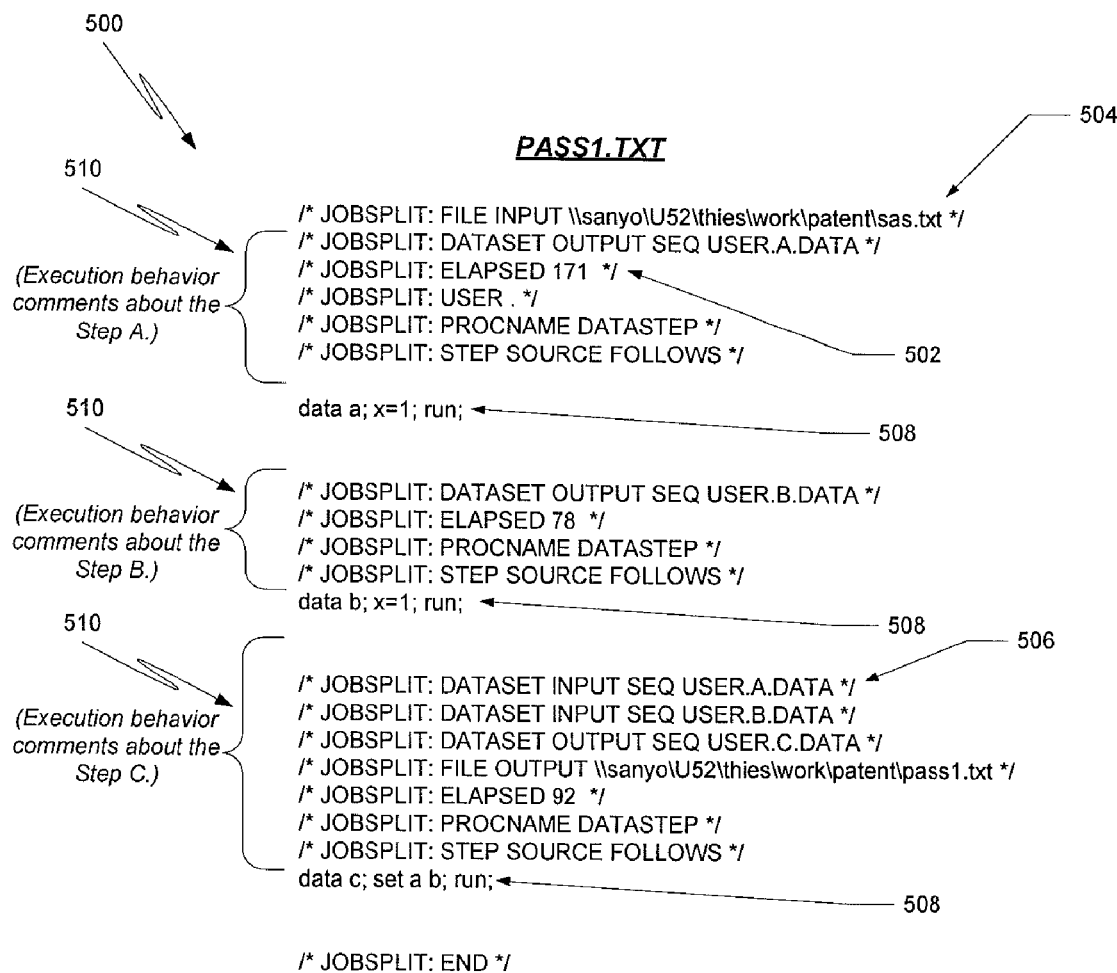

The computer program of FIG. 6 is then executed, and its execution behavior is captured. FIG. 7 shows at 500 the computer program that has been supplemented with comments about the captured execution behavior (which in this example is stored in a file named "PASS1.TXT"). The commented computer program of FIG. 7 is then analyzed to determine the dependencies of the steps.

The original lines of the computer program are shown at 508. Execution behavior comments that have been generated are shown at 510. More specifically with respect to the commented computer program of FIG. 7, line 502 indicates an approximate execution time in milliseconds. Line 504 indicates what is the input source code file (i.e., the "SAS.TXT" file of FIG. 6). It is noted that the tag "JOBSPLIT" within the code indicates that a comment about execution behavior has been added and is to be parsed later when dependency analysis is to be performed. Line 506 indicates that generation of data set "c" uses data set "a" and "b".

As shown in the generated comments of FIG. 7, the analysis has determined that there are no dependencies for the steps that respectively create data sets "a" and "b." However, the analysis has determined that the last step has a dependency because data set "c" is created based upon data generated by the other steps.

Based upon the determined dependencies, a grid-enabled computer program is generated that specifies which tasks within the computer program (i.e., steps 1 and 2) can be processed in parallel through the grid computing environment. FIGS. 8-10 show at 600 an example of a grid-enabled computer program (called "GRID.TXT") that has been generated from the commented computer program of FIG. 7. More specifically, the grid-enabled computer program 600 contains line 602 which sets the number of remote sessions. Lines 604 show the creation of three remote sessions in order to handle the three jobs in this example. Line 606 finds a remote session in the "sess" macro symbol. Lines 608 run the first task.

Lines 620 of the grid-enabled computer program runs the second task in parallel with the first task. At lines 622, the third task waits until the first two tasks complete. After completion of the first two tasks, line 624 runs the third task. Lines 630 and 632 wait for all sessions to complete and then perform a shutdown of the functions.

While examples have been used to disclose the invention, including the best mode, and also to enable any person skilled in the art to make and use the invention, the patentable scope of the invention is defined by claims, and may include other examples that occur to those skilled in the art. Accordingly the examples disclosed herein are to be considered non-limiting. As an illustration, the systems and methods described herein can be implemented in different ways, such as within a statistical analysis software environment as described in Appendix A of the following provisional patent application: U.S. Application Ser. No. 60/971,988, (entitled "Systems and Methods for Grid Enabling Computer Jobs" and filed on Sep. 13, 2007) which is incorporated herein by reference. In Appendix A, the example implementation uses two phases: the first is to create internal hooks in a supervisor to monitor a running SAS program, keeping track of dependency information such as PROC and DATASTEP I/O (datasets, catalogs, etc) Macro symbol usage, and other information for use in determining the dependencies. This information is combined with the input SAS job, and produces a copy of the SAS job interspersed with comments containing the dependency information. The second phase is to analyze the dependency information and determine which steps can be run in parallel with previous steps. As disclosed in the incorporated appendix, there can be many types of information available in the output comments, such as the following.

/* JOBSPLIT: DATASET [INPUT|OUTPUT] [SEQ|MULTI] name*/
    A dataset was opened for reading or writing.
    INPUT or OUTPUT—whether we read or wrote the data set.
    SEQ or MULTI—access pattern, whether we opened it for sequential or multipass access.
    Name—name of the dataset.
/* JOBSPLIT: CATALOG [INPUT|OUTPUT] name*/
    A catalog was opened for reading or writing.
    INPUT or OUTPUT—whether we read or wrote the catalog.
    Name—name of the catalog.
/* JOBSPLIT: FILE [INPUT|OUTPUT] name*/
    An external file was opened for reading or writing.
    INPUT or OUTPUT—whether we read or wrote the file.
    Name—name of the file.
/* JOBSPLIT: ITEMSTORE [INPUT|OUTPUT] name*/
    An itemstore was opened for reading or writing.
    INPUT or OUTPUT—whether we read or wrote the itemstore.
    Name—name of the itemstore.
/* JOBSPLIT: OPENTIME name DATE:date PHYS:phys SIZE:size*/
    A dataset was opened for input. We output the opentime and the size of the file.
    Name—name of the dataset.
    Date—date and time of the open, not creation time of the file.
    Phys—full physical name of the file opened.
    Size—size in bytes of the file.
/* JOBSPLIT: ATTR name [INPUT|OUTPUT] VARIABEL:varable name TYPE: [CHARACTER|NUMREIC] LENGTH:length LABEL:label FORMAT:format INFORMAT: informat */
    When a dataset is closed, we reopen it and output the attributes of each variable, one ATTR line per variable.
    Name—name of the dataset.
    INPUT or OUTPUT—whether we read or wrote the dataset.
    Variable—name of current variable.
    Type—CHARACTER or NUMERIC variable.
    Length—length in bytes of variable.
    Label—variable label, if any.
    Format—variable format, if any.
    Informat—variable informat, if any.
/* JOBSPLIT: SYMBOL [SET|GET] which running name*/
    A Macro symbol was accessed.
    SET or GET—whether the symbol we set or gotten
    which—the which flag sent into the call
    running—1 if we are running a macro at the time, 0 otherwise
    set—0 get, 1—set character 2,3 set number.
    name—name of the symbol
/* JOBSPLIT: TIMING number*/
    This is the number we use to determine the elapsed time (see below). number—the date/time when the task started.
/* JOBSPLIT: ELAPSED number*/
    This is the number of milliseconds (roughly) that the task took.
    Since the job is running with callbacks and the number of callbacks may vary by task.
    number—a number to use in deciding the relative run times of tasks.
/* JOBSPLIT: USER user option*/
    We use the USER option with the grid job code to allow single level dataset names to live in WORK.
    User option—the value of the USER option during the run of the code.
/* JOBSPLIT: _DATA_*/
    This task makes use of the reserved data set name _DATA_.
/* JOBSPLIT: _LAST_*/
    This task makes use of the reserved data set name _LAST_.
/* JOBSPLIT: PROCNAME [procname|DATASTEP]*/
    Specifies the name of the Proc (or DATASTEP) for this step.

As additional examples of the wide scope of the methods and systems disclosed herein, the methods and systems may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

Data signals may be conveyed via networks (e.g., local area network, wide area network, internet, wireless, combinations thereof, etc.), fiber optic medium, carrier waves, wireless networks, etc. for communication among multiple computers or computing devices. Data signal(s) can carry any or all of the data disclosed herein that is provided to or from a device.

The systems' and methods' data (e.g., associations, mappings, etc.) may be stored and implemented in one or more different types of computer-implemented ways, such as different types of storage devices and programming constructs (e.g., data stores, RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions (e.g., software code) for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

It is claimed:

1. A method for executing a computer program within a multiple processor grid computing environment, wherein the computer program is written in a sequential language such that each step of the computer program completes its execution before a next step of the computer program begins, said method comprising:
    capturing execution behavior of the computer program while the computer program is sequentially executing;
    linking the captured execution behavior with steps contained in a source code version of the computer program;
    analyzing the captured execution behavior that is linked with the steps contained in the source code version in order to determine dependencies between a step of the computer program and one or more other steps of the computer program based upon files that are created with respect to the step and the one or more other steps, based upon inputs and outputs associated with the step and the one or more other steps, and based upon macro symbols the step and the one or more other steps read and set;
    determining which task or tasks within the computer program can be processed in parallel through the grid computing environment based upon the determined dependencies;
    whereby the determined task or tasks are processed in parallel through the grid computing environment.

2. The method of claim 1, further comprising:
    creating internal hooks in a supervisor program, wherein each internal hook monitors the computer program while the computer program is executing, and wherein each internal hook captures the execution behavior.

3. The method of claim 2, wherein linking of the captured execution behavior includes generating a copy of the source code version of computer program interspersed with comments containing information about the execution behavior.

4. The method of claim 3, further comprising:
    analyzing the information about the execution behavior to determine which steps can be run in parallel with other steps.

5. The method of claim 1, further comprising:
    incorporating an instruction into the source code version that identifies a dependency between a first step and a second step, wherein the first step must be completed before the second step can begin.

6. The method of claim 5, wherein determining which task or tasks within the computer program can be processed in parallel further comprises
    incorporating an instruction into the source code version that identifies a dependency between a first task and a second task, wherein the first task must be completed before the second task can begin.

7. The method of claim 1, further comprising:
    generating one or more statements to transfer a macro symbol to a pre-selected remote session within the grid when a task can be processed in parallel.

8. The method of claim 1, further comprising:
    generating code to obtain an available connect session to run task, when the task can be processed in parallel.

9. The method of claim 1, wherein a second program external to the computer program is configured to capture the execution behavior of the computer program while the computer program is executing.

10. The method of claim 1, wherein the determined task or tasks contain one or more of the steps contained in the computer program.

11. The method of claim 1, wherein a non-transitory computer-readable data store contains the determined task or tasks.

12. The method of claim 11, wherein the non-transitory computer-readable data store contains instructions that are directly executable within the grid computing environment.

13. The method of claim 1, wherein the computer program is directed to solve a distributed application computing problem.

14. The method of claim 1, wherein the grid computer environment includes resources of multiple computers or servers in a network.

15. The method of claim 14, wherein the grid computer environment includes a grid control computer to assign portions of the computer program to the multiple computers or servers.

16. A system for executing a computer program within a multiple processor grid computing environment, wherein the computer program is written in a sequential language such that each step of the computer program completes its execution before a next step of the computer program begins, said system comprising:
    software instructions, configured to execute on a processor, for capturing execution behavior of the computer program while the computer program is sequentially executing;

software instructions, configured to execute on a processor, for linking the captured execution behavior with steps contained in a source code version of the computer program; wherein the output of the captured execution behavior is used to supplement the source code version;

software instructions, configured to execute on a processor, for analyzing the captured execution behavior that is linked with the steps of the source code version in order to determine dependencies between a step of the computer program and one or more other steps of the computer program based upon files that are created with respect to the step and the one or more other steps, based upon inputs and outputs associated with the step and the one or more other steps, and based upon macro symbols the step and the one or more other steps read and set;

software instructions, configured to execute on a processor, for determining which task or tasks within the computer program can be processed through the grid computing environment based upon the determined dependencies;

whereby the determined task or tasks are processed in parallel through the grid computing environment.

17. One or more non-transitory computer-readable mediums encoded with instructions that cause a computer to perform a method for executing a computer program within a multiple processor grid computing environment, wherein the computer program is written in a sequential language such that each step of the computer program completes its execution before a next step of the computer program begins, said method comprising:

capturing execution behavior of the computer program while the computer program is sequentially executing;

linking the captured execution behavior with steps contained in a source code version of the computer program;

analyzing the captured execution behavior that is linked with the steps contained in the source code version in order to determine dependencies between a step of the computer program and one or more other steps of the computer program based upon files that are created with respect to the step and the one or more other steps, based upon inputs and outputs associated with the step and the one or more other steps, and based upon macro symbols the step and the one or more other steps read and set;

determining which task or tasks within the computer program can be processed in parallel through the grid computing environment based upon the determined dependencies;

whereby the determined task or tasks are processed in parallel through the grid computing environment.

18. A computer-implemented method of executing a computer program, comprising:

receiving, using one or more data processors, a source code version of a computer program including a plurality of program steps to be performed in an order;

executing, using the one or more data processors, the computer program, wherein the program steps are executed in the order such that one of the program steps is completed before a next program step begins;

capturing, using the one or more data processors, execution behavior of the computer program;

generating, using the one or more data processors, associations by linking the captured execution behavior to the program steps;

determining, using the one or more data processors, one or more dependencies using the associations, wherein the dependencies are determined based upon files that are created by the program steps, inputs and outputs associated with the program steps, and macro symbols read and set by the program steps; and identifying, using the one or more data processors, which of the program steps can be performed in parallel based upon the determined dependencies, wherein when the computer program is re-executed, the identified steps are performed in parallel.

19. The method of claim 18 further comprising:

creating internal hooks in the computer program, wherein the internal hooks are used to capture the execution behavior.

20. The method of claim 19, wherein linking includes incorporating details of the captured execution behavior into a copy of the source code version of the computer program.

21. The method of claim 18, further comprising:

incorporating an instruction into the source code version that identifies a dependency between a first step and a second step, wherein the first step must be completed before the second step can begin.

22. The method of claim 18, wherein the execution behavior is captured using a second computer program.

23. The method of claim 18, wherein the identified steps are stored on a non-transitory computer-readable data store.

24. The method of claim 18, wherein the non-transitory computer-readable data store contains instructions that are directly executable within a grid computing environment.

25. The method of claim 18, wherein the grid computing environment includes resources of multiple computers or servers in a network.

26. A computer-implemented system for executing a computer program, comprising:

one or more processors;

one or more non-transitory computer readable storage mediums containing software instructions executable on the one or more processors to cause the one or more processors to perform operations including:

receiving a source code version of a computer program including a plurality of program steps to be performed in an order;

executing the computer program, wherein the program steps are executed in the order such that one of the program steps is completed before a next program step begins;

capturing execution behavior of the computer program;

generating associations by linking the captured execution behavior to the program steps;

determining one or more dependencies using the associations, wherein the dependencies are determined based upon files that are created by the program steps, inputs and outputs associated with the program steps, and macro symbols read and set by the program steps; and identifying which of the program steps can be performed in parallel based upon the determined dependencies, wherein when the computer program is re-executed, the identified steps are performed in parallel.

27. A computer program product for executing a computer program, tangibly embodied in a non-transitory machine-readable storage medium, including instructions configured to cause a data processing system to:

receive a source code version of a computer program including a plurality of program steps to be performed in an order;

execute the computer program, wherein the program steps are executed in the order such that one of the program steps is completed before a next program step begins;

capture execution behavior of the computer program;

generate associations by linking the captured execution behavior to the program steps;

determine one or more dependencies using the associations, wherein the dependencies are determined based upon files that are created by the program steps, inputs and outputs associated with the program steps, and macro symbols read and set by the program steps; and identify which of the program steps can be performed in parallel based upon the determined dependencies, wherein when the computer program is re-executed, the identified steps are performed in parallel.

* * * * *